July 30, 1929.   L. F. KENNEDY   1,722,472
ELECTRICAL DISTRIBUTION SYSTEM
Original Filed Dec. 8, 1925
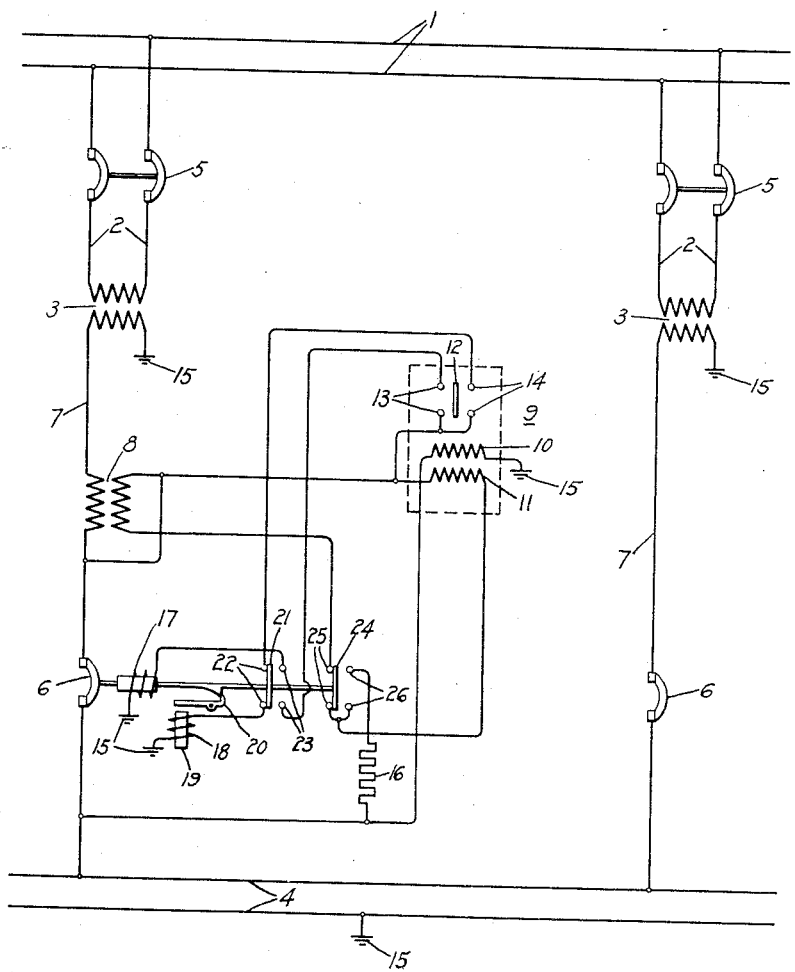
Inventor:
Luke F. Kennedy,
by
His Attorney.

Patented July 30, 1929.

1,722,472

UNITED STATES PATENT OFFICE.

LUKE F. KENNEDY, OF SCHENECTADY, NEW YORK, ASSIGNOR TO GENERAL ELECTRIC COMPANY, A CORPORATION OF NEW YORK.

ELECTRICAL DISTRIBUTION SYSTEM.

Application filed December 8, 1925, Serial No. 74,217. Renewed December 12, 1928.

My invention relates to electrical distribution systems, and particularly to alternating-current distribution systems in which high voltage feeders supply distribution transformers interconnected on their low-voltage sides to form a network.

In an alternating current distribution system provided with a plurality of high-voltage feeders, a failure of one of the feeders does not necessarily cause a failure of load supply to the network, since the sound feeders may be capable of maintaining continuity of service. However, if a feeder is disconnected at its source of supply or a short circuit occurs in the feeder, a reversal of energy flow will occur in that feeder as a result of the network supplying the magnetizing current for the transformer, or as a result of the network feeding power into a fault or short circuit on the feeder. It then becomes necessary to disconnect the distribution transformer to prevent feed back of energy from the network, and it is also desirable to reconnect the distribution transformer to the network when normal conditions have been restored.

Difficulties have arisen in providing a mechanism, which is simple and reliable in operation, to disconnect the distribution transformer from the network on reverse energy flow because of the great range of current values encountered, namely, a comparatively small value of magnetizing current and the high value of current due to a fault or short circuit fed from the network.

It is, therefore, an object of my invention to provide an improved means which is simple, sensitive and reliable in operation for disconnecting distribution transformers from a network on a reversal of energy flow and reconnecting the transformers to the network when normal conditions have been restored.

For the purpose of explaining the present invention, it has been illustrated in the accompanying drawing as applied to an alternating-current distribution system with an interconnected secondary system, but it will be understood that it may be applied to other systems of electric distribution and in general to two interconnected alternating-current circuits subject to a reversal of energy flow between the circuits.

In accordance with my invention, as embodied in an alternating current network system, a circuit breaker in a feeder is controlled by a power directional relay to effect the connection and disconnection between a distribution transformer secondary and the network in accordance with the direction of current flow in the transformer secondary. The directional relay is provided with two main operating windings, one of which is normally arranged to be energized in accordance with the voltage of the network and the other, called a current winding, is so connected that all of the turns are effective when the circuit breaker is closed or when the circuit breaker is open. Auxiliary means are provided on the circuit breaker to connect the current winding across the secondary of a current transformer interposed in the feeder circuit so that the current winding is energized in accordance with the direction of current flow in the current transformer when the circuit breaker is closed. When the circuit breaker is open, auxiliary means are provided to connect the current coil directly in a circuit between the distribution transformer secondary and the network so as to be energized in accordance with the direction of the current flow resulting from the difference in magnitude and phase of the voltage between the two circuits. This auxiliary switch is a means for eliminating any difficulty that may be experienced should the impedance of the current transformer be sufficiently high to affect the operation of the current coil when the circuit breaker is open. The arrangement and connection of this single current coil eliminates the necessity of using two current coils, one which is effective when the circuit breaker is closed and another which supplies an operating torque for the power directional relay when the circuit breaker is open. The elimination of the second current coil obviates the difficulty which may arise due to the magnetic interaction between two coils in mutual inductive relation, while the arrangement of the single coil to be conductively energized when the circuit breaker is open by the voltage between the two circuits, eliminates additional apparatus to energize the current coil. The whole arrangement, therefore, embraces simplicity in the number of parts required and provides an apparatus which is sensitive and highly responsive either with a reverse current of a small value or a reverse current of a large value.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which the single figure is a schematic illustration of an alternating-current distribution system in which my invention has been embodied.

Referring to the drawing, 1 indicates the primary high-voltage mains of a distribution system connected to high voltage feeders 2, suplying distribution transformers 3, which are interconnected on their low voltage sides by the distributing network 4. Circuit breakers 5 of any suitable type are inserted in the main feeders 2, while network circuit breakers 6 are provided in the low-voltage mains 7 connected to the secondary of the distribution transformers. In order to simplify the disclosure, only one feeder is shown equipped with the apparatus for effecting the automatic disconnection and reconnection of the transformer secondary, but it will of course be understood that each feeder, or any desirable number of feeders, may be similarly equipped. A current transformer 8 is inserted in series with the circuit breaker 6 which is controlled by a network relay 9 of the power-directional type. The relay 9 is shown as comprising a voltage coil 10, a current coil 11, a contact 12, and contact points 13 and 14. The current transformer 8 is arranged to saturate at a low value of load current so as to limit the voltage impressed on the current coil and prevent excessive heating under any value of load current during the operation of the system.

For simplicity of illustration, I have shown a secondary network which has one side thereof permanently connected to ground. One terminal of voltage coil 10 is grounded at 15 while the other terminal thereof is connected to the network. Circuit breaker 6 is provided with closing and opening means shown as comprising a closing coil 17, and an opening coil 18 having a plunger 19 to disengage a latch 20 which holds the breaker closed when it is desired to have the distribution transformer connected to the network. Circuit breaker 6 is also provided with auxiliary switching means shown as contacts 21 and 24 having contact points 22 and 23, and 25 and 26 respectively. Contact 21 and its contact points 22 and 23 provide a control for completing the circuit of the opening and closing coils when circuit breaker 6 is in the closed or open position. Contact 24 and its contact points 25 and 26 are arranged to complete a circuit so that when circuit breaker 6 is closed current coil 11 is connected in series with the secondary of transformer 8, and when circuit breaker 6 is open current coil 11 is connected across the terminals of circuit breaker 6 in series with an impedance, shown as a resistance 16, which is provided to limit the current through the current coil.

The coil 11 is referred to herein as a current coil in order to differentiate clearly from the voltage coil 10, but from the description hereinafter it will be apparent that the coil, though responsive to current, might be considered a voltage coil when circuit breaker 6 is open, since it is subjected to the difference in voltage resulting from the difference in magnitude and phase of the voltage between the transformer secondary and the network.

The closing coil 17 is arranged to be connected to the circuit breaker side of current transformer 8 in order to avoid a periodically opening and closing of the circuit breaker on an attempted reconnection. The closing coil 17 takes a comparatively large operating current and a part of this current will be supplied from the network as soon as the tips of the circuit breaker touch the breaker contacts. If the closing coil were connected to the feeder between the current transformer and the transformer secondary, the current supplied by the network would flow through the current transformer 8 in the reverse direction and produce an opening torque in the power directional relay. It will be observed that a terminal of current coil 11 is connected between current transformer 8 and circuit breaker 6. When circuit breaker 6 is open the direct energization of curent coil 11, due to the current flow in the series circuit between the transformer secondary and the network, is supplemented as a result of the energization of the current transformer by the series-circuit current, so that an additional torque is provided to move contact 12 to close its contact points 13.

The operation of the arrangement for the various circuit conditions at different points of the cycle of operations is somewhat as follows: Assume that circuit breakers 5 and 6 of one feeder shown with the control apparatus are in the open position and that the other feeder is energized and connected to the network. Voltage coil 10 will be energized from the network and current coil 11 will be energized by a reverse current flow in a circuit from the network through resistance 16, contact 24, closing contacts 26, current coil 11, the primary of current transformer 8, conductor 7, the secondary of transformer 3, to the ground 15. Contact 12 will now be subjected to an actuating torque and is arranged to close contact points 14. If circuit breaker 5 is now closed, the primary of transformer 3 and thereby its secondary will be energized from the supply mains 1. With circuit breaker 6 in the open position contact 24 bridges its contact points 26 and completes a circuit so that current coil 11 is connected between the transformer secondary and the network in a circuit from the secondary of transformer 3, conductor 7, current transformer 8, current coil 11, contact 24, resistance 16, to network side of circuit breaker 6. Current coil 11 is now in a series circuit across the circuit breaker terminals and will be energized in accordance with the direction of current resulting from the difference in magnitude and phase of the voltage between the network and the transformer secondary. When the transformer voltage bears a certain relation to the network voltage, as for example, when it is slightly higher and in phase with the network voltage so as to permit current flow to the network, the two windings of the relay will cooperate to move contact 12 to bridge its contact points 13. With circuit breaker 6 in the open position and contact 21 bridging its contact points 23, a circuit will be completed through closing coil 17 from the secondary of transformer 3, conductor 7, current transformer 8, contact 12, bridging contact points 13, contact 21, coil 17, to the other side of the system shown as the ground 15. Upon the energization of coil 17, circuit breaker 6 is closed and latch 20 takes its illustrated position and holds the breaker in its closed position.

As soon as circuit breaker 6 closes, power flow is from transformer 3 to the network and the secondary of current transformer 8 is energized. With circuit breaker 6 in the closed position, contact 24 has opened its contact points 26, thereby breaking the circuit around the circuit breaker terminals and now bridges contact points 25, completing a circuit connecting current coil 11 in series with the secondary of the current transformer 8. Current coil 11 is now energized from the secondary of current transformer 8 in accordance with the load current and maintains contact 12 in the position taken initially.

Now if feeder 2 is deenergized by opening circuit breaker 5, transformer 3 will take its magnetizing current from the network. Since the direction of energy flow is in the reverse direction, current transformer 8 will be energized in such a manner as to cause a reverse current flow in current coil 11. The current coil 11 cooperating with the voltage coil 10 will now be instrumental in moving contact 12 to bridge its contact points 14. This movement of contact 12 completes a circuit for the opening coil 18 from conductor 7, through contact 12, contact 21, coil 18, to the other side of the system, shown as a ground 15. As soon as coil 18 is energized the plunger 19 is moved to a position to disengage latch 20 and circuit breaker 6 moves to its open position, thereby breaking the circuit through opening coil 18. This movement of the breaker causes its contact 21 to bridge its contact points 23 in the circuit of the closing coil 17 and contact 24 bridges its contact points 26, placing the current coil 11 in a series with resistance 16 around the circuit breaker terminals so that the current coil with a high resistance in series therewith is now the only connecting link between the feeder and the network. The same cycle of operations will take place for a reversal of energy flow due to a fault or short circuit in feeder 2.

If circuit breaker 5 is again closed and the conditions of potential, both as to magnitude and phase, are such as to permit energy flow from the transformer secondary to the network, current coil 11 will be instrumental in moving contact 12 to bridge its contact points 13. A circuit is again completed for the closing coil 17 and circuit breaker 6 will be moved to a circuit closing position in the same manner as described before the reversal of energy flow.

It will be obvious to those skilled in the art that changes and modifications may be made in the construction and arrangement of parts without departing from my invention and it will be obvious that my invention is not limited to the interconnection of circuits utilizing a power transformer between the circuits, and I, therefore, aim in the appended claims to cover all such changes and modifications as fall within the true spirit and scope of my invention.

What I claim as new and desire to secure by Letters Patent of the United States is:

1. In combination, two alternating-current electric circuits, a switch for interconnecting said electric circuits, a current transformer in series relation with said switch, a directional relay comprising two operating windings for controlling the opening and closing of said switch, one of said windings being arranged to be energized in accordance with the voltage of one of said circuits, and auxiliary switching means for connecting the other of said windings in series with the secondary of said current transformer when said switch is closed whereby said winding is energized in accordance with the direction of current flow in said current transformer and for connecting the same winding between said electric circuits when said switch is open whereby said winding is energized in accordance with the difference in magnitude and phase of the voltage between said electric circuits.

2. In combination, two alternating current electric circuits, a switch for interconnecting said electric circuits, a current transformer in series relation with said switch, a directional relay comprising two operating windings for controlling the opening and closing of said switch, an impedance arranged to be inserted in a circuit with one of said windings when said switch is open, auxiliary switching means for connecting one of said windings in series with the secondary of said current transformer when said switch is closed whereby said winding is energized in accordance with the direction of current flow in said current transformer, and auxiliary switching means for connecting the same winding in series with said impedance between said electric circuits when said switch is open, and whereby said winding is energized in accordance with the difference in magnitude and phase of the voltage between said electric circuits.

3. A transformer circuit controlling system for alternating-current networks wherein a switch is provided for connecting and disconnecting the secondary of the transformer and the network, comprising in combination a directional relay provided with a voltage coil and a current coil, said voltage coil being arranged to be energized in accordance with the voltage of said network, a current transformer connected in series relation with said switch, an impedance arranged to be inserted in circuit with said current coil, auxiliary switching means for connecting said current coil in series with the secondary of said current transformer when said switch is closed whereby said current coil cooperates with said voltage coil to operate the relay for effecting opening of said switch when current flow is from said network to said transformer secondary, and auxiliary switching means for connecting said current coil and said impedance in series between said transformer secondary and said network when said switch is open whereby said current coil cooperates with said voltage coil to operate the relay to effect closing of said switch when current flow is from said transformer secondary to the network.

In witness whereof, I have hereunto set my hand this 7th day of December, 1925.

LUKE F. KENNEDY.